United States Patent [19]

Andersson et al.

[11] 4,024,337
[45] May 17, 1977

[54] DC ARC FURNACE AND STARTING ELECTRODE CONSTRUCTION

[75] Inventors: Conny Andersson; Erik Lassander, both of Viken, Sweden

[73] Assignee: ASEA Aktiebolag, Vasteras, Sweden

[22] Filed: Dec. 11, 1975

[21] Appl. No.: 639,917

[30] Foreign Application Priority Data

Dec. 12, 1974 Sweden .............................. 7415576

[52] U.S. Cl. ...................................... 13/18; 13/9 R
[51] Int. Cl.² .......................................... H05B 7/00
[58] Field of Search ........................ 13/9, 10, 12, 18

[56] References Cited
UNITED STATES PATENTS 3,054,166  9/1962  Spendelow, Jr. et al. ....... 13/18 UX
3,835,230  9/1974  Valchev et al. ........................ 13/9

Primary Examiner—R. N. Envall, Jr.
Attorney, Agent, or Firm—Kenyon & Kenyon Reilly Carr & Chapin

[57] ABSTRACT

A DC arc furnace has a hearth through which electric power is transmitted to a melt, and at least one starting electrode which can be inserted into the furnace from its outside, for pressing against a pile of scrap on the furnace's hearth so that with the furnace's arcing electrode, a circuit can be formed effecting a melt-down of the scrap. The hearth is of the type permitting electric power to be transmitted through it to the resulting melt once the melt is formed, and the starting electrode being thereafter inactivated. This starting electrode is characterized by being made of metal and having a tip of carbonaceous material, such as graphite, providing the starting electrode with the rugged characteristics required for its insertion into and removal from the furnace for start-up of the furnace, while at the same time providing a tip that is particularly resistant to the heat and possible incidental arcing occurring during the use of the starting electrode.

5 Claims, 3 Drawing Figures

DC ARC FURNACE AND STARTING ELECTRODE CONSTRUCTION

BACKGROUND OF THE INVENTION

A DC arc furnace is desirably operated with the arcing electrode or electrodes powered with the same polarity, particularly negatively powered so that the one or more arcing electrodes all operate as cathodes. To provide the other connection, the furnace's hearth must be made so that electric power can be transmitted through it to a melt formed on the hearth, making the melt an anode when the electrodes are operated as cathodes. This requires the hearth to be provided with a hearth connection, which is insufficient or ineffective when scrap is initially charged on the hearth for an initial melt-down by the arcing electrodes. Therefore, such a furnace is provided with one or more starting electrodes which are inserted through an opening in the furnace enclosure over the hearth, and into contact with the scrap piled on the hearth for initial melting. Such a starting electrode must have its tip pressed into the pole of scrap, and during the starting-up or melt-down period of operation, arcing inevitably occurs between the starting electrode tip and the scrap pieces, even though the electrode is pressed firmly into the scrap. This, plus electric resistance heating effects, results in such a starting electrode, normally made of metal, having an undesirably short service life.

SUMMARY OF THE INVENTION

To overcome this defect, the starting electrode is provided with a tip made of carbonaceous material, particularly graphite, and the starting electrode, otherwise comprising a metal bar, is made hollow and provided with water-cooling throughout its length and up to the graphite tip and so as to cool the graphite tip itself.

The graphite tip is provided with an internally threaded recess and the front or working end of the bar forming the electrode is provided with an externally threaded projection of relatively massive proportions, the tip being screwed on this projection. The internal water-cooling may be continued right up to the base of the externally threaded projection which can also be made of metal and welded to the front or working end of the electrode. In this way the bar forming the electrode can be cooled throughout its length while, at the same time, the graphite tip can conduct heat to the metal externally threaded extension which is welded or otherwise integrally connected with the front or working end of the starting electrode bar so that the internal water-cooling of the latter can impinge directly against the base of inner end of this metal externally threaded connection, permitting heat to be removed at a high rate from the graphite tip, while at the same time, the bar forming the electrode is itself, effectively cooled.

BRIEF DESCRIPTION OF THE DRAWINGS

Various specific examples of this invention are, in a largely schematic manner, illustrated by the accompanying drawings, in which.

DETAILED DESCRIPTION OF THE INVENTION

Figure 1:
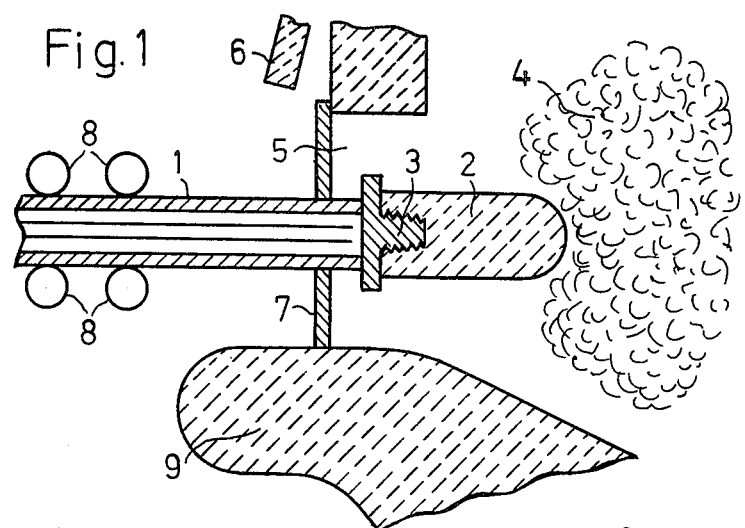
FIG. 1 shows an example of the new starting electrode in operation, this being a vertical section through the electrode and a pertinent portion of the electric furnace with which the electrode is used.

Having reference to the above drawings, FIG. 1 shows the new starting electrode as comprising a metal bar 1, shown end and connected to the bar 1 by a screw-threaded connection 3, the tip 2 being shown as pressing into a pile of scrap 4 by being inserted through the deslagging port 5 of an electric arc furnace, this deslagging port 5 being normally closed by a door 6 which is opened for the insertion of the starting electrode during the melt-down phase of the operation of the furnace, required to reduce the scrap 4 to a melt, making the furnace's hearth connection effective. The bar or electrode 1 is shown as being straight and as carrying its own closure 7, fixed to the bar, for the deslagging port 5, this closure 7 closing the deslagging port during the use of the starting electrode when the arcing noise, smoke and fumes within the furnace are particularly objectionable. In this instance, the starting electrode is shown as being guided into and from the furnace by running between guiding rollers 8.

Figure 2:
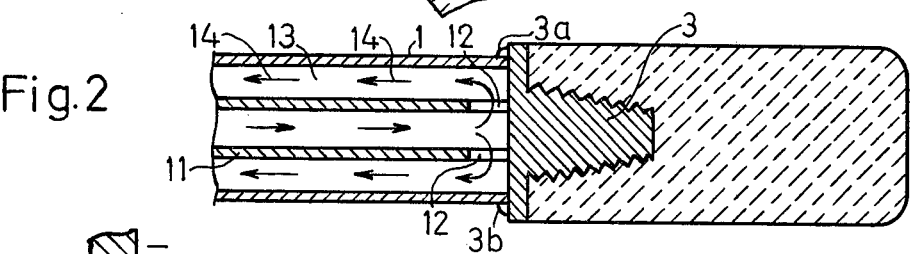
FIG. 2 on an enlarged scale shows the details of the new starting electrode, in vertical section.

FIG. 2 on an enlarged scale shows that the graphite tip 2, which is of necessity relatively massive, is screwed on a relatively massive extension 3, these two parts having a recess that is internally screw threaded and an exterior that is externally screw threaded, respectively. This extension 3 has a base 3a which is integrally joined to the tubular bar 1 forming the electrode, as by being welded as indicated at 3b, to the bar. The bar, being tubular, internally contains a pipe 11 spaced concentrically within the tubular bar and having an interior forming a forward passage for cooling water which, when introduced to the opposite end of the bar (not shown) drives forwardly and directly against the flat base of the extension 3; via radial passages 12, the cooling water then returning via an annular outer passage 13 within the tubular bar 14 in the direction indicated by the arrows 14. It can be seen that the cooling water drives directly against the flat base 3a of the metal extension 3 and removes the heat thus absorbed, by returning via the annular passage 13, the relatively massive metal extension 3, to which the graphite 2 is tightly screwed, sucking off heat from the tip and transmitting it to the extension's base 3a from which the heat is being removed.

Although in FIG. 1, the pile of scrap 4 is shown as extending substantially above the level of the deslagging port 5 of the furnace, permitting the illustrated horizontal insertion to obtain a firm contact with the scrap, commercial furnace designs to not always provide this type of convenience.

Figure 3:
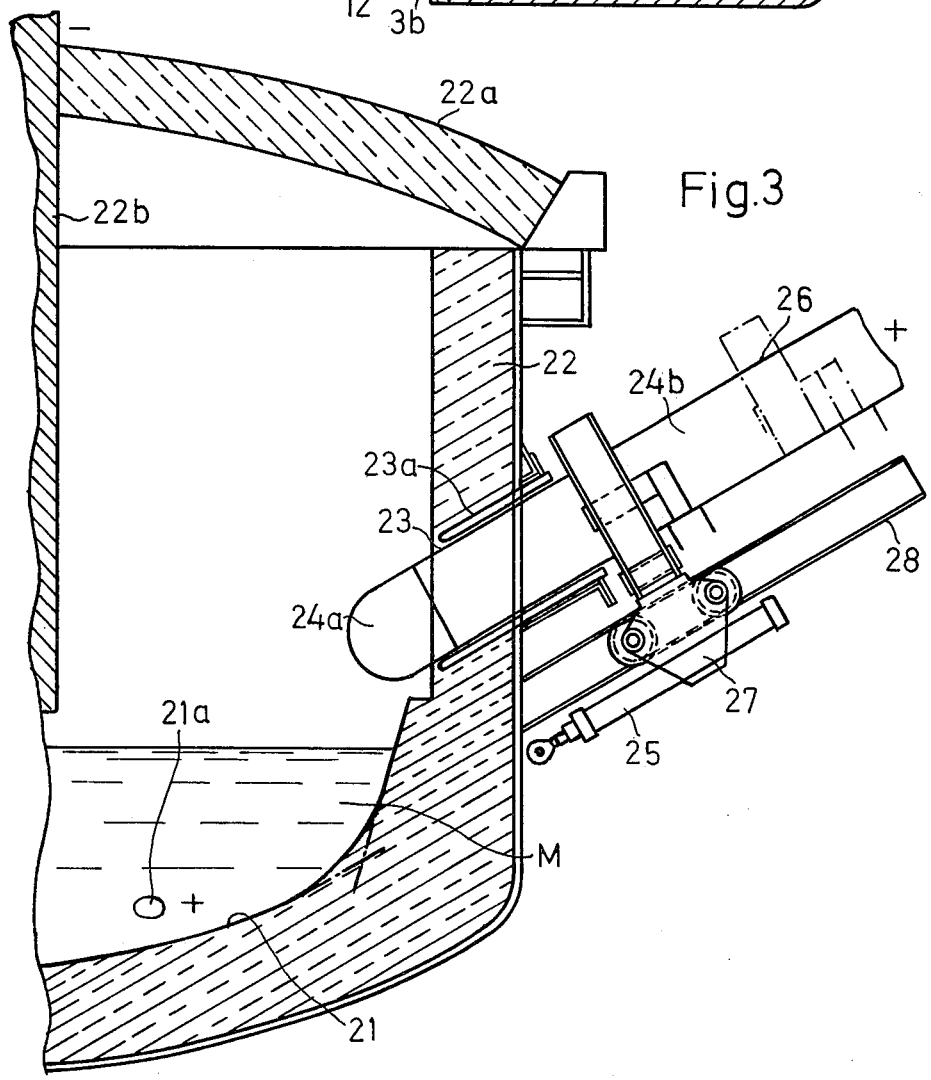
FIG. 3 shows another manner in which the new electrode can be used, while illustrating the pertinent elements of an electric furnace to which the starting electrode is applied.

Therefore, FIG. 3 is provided, showing an electric arc furnace having a hearth 21 through which the anodically connected hearth connection 21a projects, for contact with the ultimately formed melt M, such a hearth connection performing with full effectiveness only after the formation of a melt, even though two or more such hearth connctions may be provided. The furnace has the usual cylindrical upstanding side wall 22 and the removable roof 22a down through which the cathodically powered graphite arcing electrode 22b extends downwardly. This arcing electrode is also used to melt down a scrap charge on the hearth, and it is during such a melt-down that the starting electrode is required.

In this instance, the side wall 22 is provided with a special opening 23, as contrasted to the use of the deslagging port illustrated in FIG. 1. However, like the deslagging port, this special port must be positioned above the level of the melt M ultimately formed in the hearth 21, and preferably above the level of the slag floating on the melt, because after the melt and slag formation, it is preferable not to have any openings above the levels of these components. This opening 23 is shown as extending downwardly towards the hearth 21 in a downward diagonal direction or angularly downwardly and as being provided with a water-cooled ring 23a through which the starting electrode is inserted into the furnace.

In this case, the starting electrode has a tip 24a made of graphite, but the balance of the starting electrode 24b is made of solid metal and with massive proportions so that heat is removed from the tip 24a in an effective manner because of the cross-sectional area and thermal conductivity of the solid bar 24b.

In this case of FIG. 3, the electrode is moved in and out via a hydraulic cylinder 25, the electrode being held between a clamp 26 carried by a carriage 27 which is run up and down on an inclined rail system 28. In the operation of the furnace disclosed herein, scrap is charged on the hearth 21 and although it may contact the one or more hearth connections 21a, the loose condition of the scrap or possibly other metal particles, does not permit the formation of a completely effective electrical contact, permitting the graphite arcing electrode 22b, to effectively melt down the charge.

The bulk of scrap or metal pieces is of much greater volume than the melt that can be formed from such a charge. Therefore, the pile normally extends high enough, as indicated at 4 in FIG. 1, for the starting electrode to be pushed into contact with the scrap or other type of initially solid charge on the hearth 21. In FIG. 1 the scrap 4 is piled high enough for the starting electrode's tip 2 to press into the charge. In FIG. 3 the diagonal position of the starting electrode's travel, permits the use of the starting electrode even if the In either case, the starting electrode tip is pushed into the pile of scrap or other solid metal type of charge, this providing the electrical connection required to put enough positive electric power of positive polarity into the charge, for the negatively charged usual working electrode 22b to form an arc effecting the melt-down of the charge, the starting electrode being withdrawn after a melt is formed and making the hearth connection or connections 21a effective.

In all cases the graphite tip on the new starting electrode operates to provide the required connection. At the same time, because scrap involves pieces of solid metal, some unintentional arcing between the starting electrode and the charge does occur. Therefore, with the present invention, to some extent the starting electrode functions as an arcing electrode, although unintentionally. However, such localized arcing can be accommodated because of the graphite tip 2 or 24a, as the case may be. At the same time, with the normal arcing electrode 22b functioning as a cathode, the starting electrode must function as an anode, so that the unintentional arcing occurring between the graphite tip and the charge, means that, in effect, an arcing electrode is functioning as an anode.

When an arcing electrode functions as an anode, its service life is very much shorter than that of a cathodic electrode forming an arc. Such destructive operating conditions have been found to be particularly destructive in the case of an all-metal starting electrode. Even with the graphite tip of the present invention heavily cooled either by the water-cooling previously described or by the heat conduction away from the tip by the massive electrode bar 24b, also referred to hereinabove, the tip 2 or 24a must operate under relatively unfavorable conditions since it must function as an anode. However, as shown in detail particularly well by FIG. 2, the graphite tip is screwed onto the heavily cooled forwardly projecting extension 3. The same construction can be used in the case of the FIG. 3 example. The interfaces between the threaded parts are, therefore, heavily cooled and, of course, a suitable parting compound (not shown) can be used between the threaded parts. Thus, the graphite tip is removable and replaceable when required, and because in all instances the starting electrode can be positioned for removal from the furnace, removal and replacement of the graphite tip is possible. The starting electrode is, of course, used only during the start-up or melt-down phases of the furnace's operation.

In the case of the mounting shown by FIG. 3 of the starting electrode, the mounting may be permanently built into the side of the electric arc furnace. The normal operation of an electric arc furnace requires that it be tilted for tapping and possibly for deslagging, the previously referred to rails 28 and actuator 25 being permanently mounted on the side of the furnace to tilt with the furnace, so normal furnace operations can be carried out.

In the case of the example shown by FIG. 1, a closure 7 is used to close the deslagging port 5 during the melt-down, whereas in FIG. 3 being a furnace built-in construction, the starting electrode can be fitted relatively snugly within the water-cooled ring 23a as is done normally in the case of the usual arcing electrode, exemplified at 22b.

In the case of FIG. 1, the mounting arrangement has the possible objection that the guiding rollers 8 are in the way of the normal deslagging operation conducted after the melt is formed and melt processing is under way or completed.

However, although in all illustrations shown, the starting electrode is shown as comprising a linear metal bar, either massive and solid or tubular and water-cooled, the portion of the bar illustrated in FIG. 1 in particular, can be curved with the electrode extended, whether solid or internally water-cooled, and mounted by a lever arrangement pivotally mounted on the outside of the furnace so that the electrode can be swung clear from the furnace, permitting the normal tilting operations required of electric furnaces in general.

What is claimed is:

1. A DC arc furnace comprising a hearth through which electric power can be transmitted to a melt when formed on the hearth, an enclosure for the hearth, at least one arcing electrode extending through said enclosure for initially melting a charge of solid metal on said hearth and thereafter heating the resulting melt, said enclosure having at least one opening, and a starting electrode through which electric power is transmitted to a charge of solid metal on said hearth until the charge is melted down to a melt on the hearth, said starting electrode comprising a metal bar long enough to be positioned through said opening with an outer end portion available for connection with an electric power source and an inner end for forming a connection with a charge of solid metal on said hearth, and having a tip for contacting said charge and made of carbonaceous material connected to said inner end, a closure for space around said rod when the rod is positioned through said opening, being connected to said rod, and rod being insertable and removable from said enclosure through said opening, and said closure closing said space when the rod is inserted through said opening.

2. The furnace of claim 1 in which said rod is tubular and internally has water-cooling passages extending to said tip.

3. The furnace of claim 1 in which said rod is solid and has a cross section and thermal conductivity carrying heat from said tip via the rod to the rod's said outer portion at a rate effectively cooling said tip.

4. The furnace of claim 2 in which the inner end of said rod has an externally screw threaded metal extension extending therefrom, and said tip has an internally screw threaded recess and is screwed on said tip.

5. The furnace of claim 1 having on the outside of said enclosure means for movably mounting said rod for endwise movement into and out from said enclosure.

* * * * *

UNITED STATES PATENT AND TRADEMARK OFFICE
CERTIFICATE OF CORRECTION

PATENT NO. : 4,024,337
DATED : May 17, 1977
INVENTOR(S) : Conny Andersson and Erik Lassander It is certified that error appears in the above—identified patent and that said Letters Patent are hereby corrected as shown below:

Column 2, line 9, after "shown" insert --as being tubular, with the graphite tip on its front or working--.

Column 2, line 63, change "connctions" to --connections--.

Column 3, line 43, after "even if the" insert --charge is piled to a lower level.--.

Signed and Sealed this

Sixth Day of September 1977

[SEAL]

Attest:

RUTH C. MASON
Attesting Officer

LUTRELLE F. PARKER
Acting Commissioner of Patents and Trademarks